United States Patent
Xu et al.

(10) Patent No.: US 12,107,810 B1
(45) Date of Patent: Oct. 1, 2024

(54) SYSTEM AND METHODS FOR UTILIZING PERSONAL GRAPHICAL ELEMENTS IN ELECTRONIC COMMUNICATION

(71) Applicant: Adeia Guides Inc., San Jose, CA (US)

(72) Inventors: Ning Xu, Irvine, CA (US); Reda Harb, Tampa, FL (US); Tao Chen, Palo Alto, CA (US); Dhananjay Lal, Englewood, CO (US); Jean-Yves Couleaud, Mission Viejo, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/215,676

(22) Filed: Jun. 28, 2023

(51) Int. Cl.
*H04L 51/10* (2022.01)
*G06F 3/0482* (2013.01)
*H04L 51/04* (2022.01)

(52) U.S. Cl.
CPC ............ *H04L 51/10* (2013.01); *G06F 3/0482* (2013.01); *H04L 51/04* (2013.01)

(58) Field of Classification Search
CPC ........ H04L 51/04; H04L 51/10; G06F 3/0482
See application file for complete search history.

(56) References Cited

U.S. PATENT DOCUMENTS

| | | | | |
|---|---|---|---|---|
| 2005/0055639 A1* | 3/2005 | Fogg | ...................... | G06Q 10/10 |
| | | | | 715/201 |
| 2016/0037311 A1* | 2/2016 | Cho | ................... | H04M 1/72433 |
| | | | | 455/466 |
| 2017/0331769 A1* | 11/2017 | Curry | ..................... | H04L 51/043 |
| 2019/0228552 A1* | 7/2019 | Lee | .......................... | G06T 11/60 |
| 2019/0379618 A1* | 12/2019 | Rabbat | ..................... | G06F 40/20 |
| 2022/0091706 A1* | 3/2022 | Winn | ....................... | G06F 16/54 |
| 2022/0191158 A1* | 6/2022 | Cha | .......................... | G06F 40/30 |
| 2023/0082635 A1* | 3/2023 | Pandit | ................... | G06F 40/274 |
| | | | | 715/753 |

OTHER PUBLICATIONS

Billy Shaw Susanto, "The Evolution of Communication and Why Stickers Matter", (https://www.forbes.com/sites/forbestechcouncil/2018/07/31/the-evolution-of-communication-and-why-stickers-matter/?sh=3ccd7aaa2b2f), (3 pages).

Devlin, Jacob, et al. "Bert: Pre-training of deep bidirectional transformers for language understanding." arXiv preprint arXiv:1810.04805 (2018).

Dr. Robert Frischholz, "The Face Detection Technology Homepage" (https://facedetection.com/), (2 pages).

Eff, "Face recognition" (https://www.eff.org/pages/face-recognition), (6 pages).

Geng, Z., Cao, C., Tulyakov, S.: 3d guided fine-grained face manipulation. In: Proceedings of the IEEE Conference on Computer Vision and Pattern Recognition. pp. 9821-9830 (2019).

(Continued)

*Primary Examiner* — Jeong S Park
(74) *Attorney, Agent, or Firm* — Haley Guiliano LLP

(57) ABSTRACT

Systems and methods are described for suggesting personal graphical elements for inclusion in a conversation. At least one message in a conversation is analyzed to determine an emotion or sentiment and the conversation participants are identified. Personal graphical elements, labeled with metadata and associated emotions, are selected from a database.

18 Claims, 8 Drawing Sheets

(56) References Cited

OTHER PUBLICATIONS

John Voorhees, "Sticker Drop Lets You Use iOS 16's Subject Isolation Feature to Make iMessage Stickers", (https://www.macstories.net/reviews/sticker-drop-lets-you-use-ios-16s-subject-isolation-feature-to-make-imessage-stickers/), (4 pages).

Lyndon Seitz, "Average Daily Time Spent on Social Media (Latest 2024 Data)", (https://www.broadbandsearch.net/blog/average-daily-time-on-social-media), (6 pages).

Ning Xu, et al., "Generating Memes and Enhanced Content in Electronic Communication", (U.S. Appl. No. 18/219,473, filed Jul. 7, 2023).

Open AI, "Customizing GPT-3 for your application Fine-tune with a single command", (https://openai.com/blog/customizing-gpt-3), (6 pgs).

Sumedh Vilas Datar, et al., "Portrait Segmentation Using Deep Learning" (https://arxiv.org/abs/2202.02705), (1 page).

Vemou, "TechDispatch #1/2021—Facial Emotion Recognition" (https://edps.europa.eu/data-protection/our-work/publications/techdispatch/techdispatch-12021-facial-emotion-recognition_en), (5 pages).

Vivek Raj Shrestha, "Enhancement of color saturation and color gamut enabled by a dual-band color filter exhibiting an adjustable spectral response", https://opg.optica.org/oe/fulltext.cfm?uri=oe-22-3-3691&id=279318)(8 pgs.).

Wikipedia, "Filter (social media)", (https://en.wikipedia.org/wiki/Filter_(social_media)#Beauty_filter), (3 pages).

\* cited by examiner

SYSTEM AND METHODS FOR UTILIZING PERSONAL GRAPHICAL ELEMENTS IN ELECTRONIC COMMUNICATION

BACKGROUND

Messaging applications are a primary mode of communication, and the use of graphical elements such as emojis, GIFs, and personal graphical elements has become increasingly popular. These elements add expressiveness and personalization to text-based conversations. However, existing methods of selecting these elements often rely on generic libraries, lacking the ability to personalize the graphical elements in a meaningful way. Furthermore, current systems may fail to consider the context of a conversation, the relationship between the participants in the conversation, and the emotional tone when suggesting graphical elements, leading to suggestions that may not be appropriate or relevant. Moreover, existing methods often do not provide an intuitive way for users to access more information about the graphical elements, such as their origin or associated metadata.

SUMMARY

Systems and methods are provided herein for suggesting personal graphical elements to participants in a messaging application. At least one message in a conversation is analyzed to determine an emotion. Participants involved in the conversation are identified, and based on this information along with the determined emotion, at least one personal graphical element is selected from a database of personal graphical elements labelled with metadata and an emotion. The selected personal graphical elements are suggested to the user for potential inclusion in the conversation. The personal graphical elements may be selected based on the context, emotional tone, the participants involved in at least a portion of the conversation and persons referenced in the conversation who are not participating in the conversation.

In some examples, techniques are provided for generating a database of personal graphical elements. At least one person from a digital media asset is identified. A portion of an image derived from this asset to form a personal graphical element, wherein the image is taken from the digital media asset. Metadata corresponding to the identified person is retrieved, an emotion associated with the personal graphical element is determined, and each personal graphical element is associated with the retrieved metadata and the determined emotion.

In some examples a user interface element is provided. This element is designed to provide the participants involved in the conversation with the option to request viewing of the parent digital media asset associated with a personal graphical element included in the conversation. This feature may provide participants with additional context if desired, allowing them to view the original media from which the personal graphical element was derived.

In some examples, the digital media asset may comprise one or more of a video, or a gif or any other form of motion picture.

In some examples, techniques are provided that may also determining an action being performed by the identified person.

In some examples, relationships between the participants of the conversation and the persons represented by the personal graphical elements are determined. The personal graphical elements may feature persons mutually known to the conversation participants.

In some examples, determining relationships between the participants of the conversation and the persons represented by the personal graphical elements may be further informed by data from external sources, including but not limited to, social media accounts.

In some examples, the determined emotion may be enhanced by modifying the personal graphical element. This enhancement may intensify the communicated emotion, making it more evident and impactful when used in a conversation.

In some examples, the process of analyzing at least one message in a conversation to determine an emotion may be selectively applied to a specific portion of the conversation. This may allow for the relevance of the suggested personal graphical elements to be tuned according to the most recent or important parts of the conversation.

In some examples, the personal graphical elements may be ranked selected and presented based on a relevance scoring system. This scoring system may consider the determined emotion, the identified participants, and a frequency of the personal graphical elements' usage in previous conversations.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
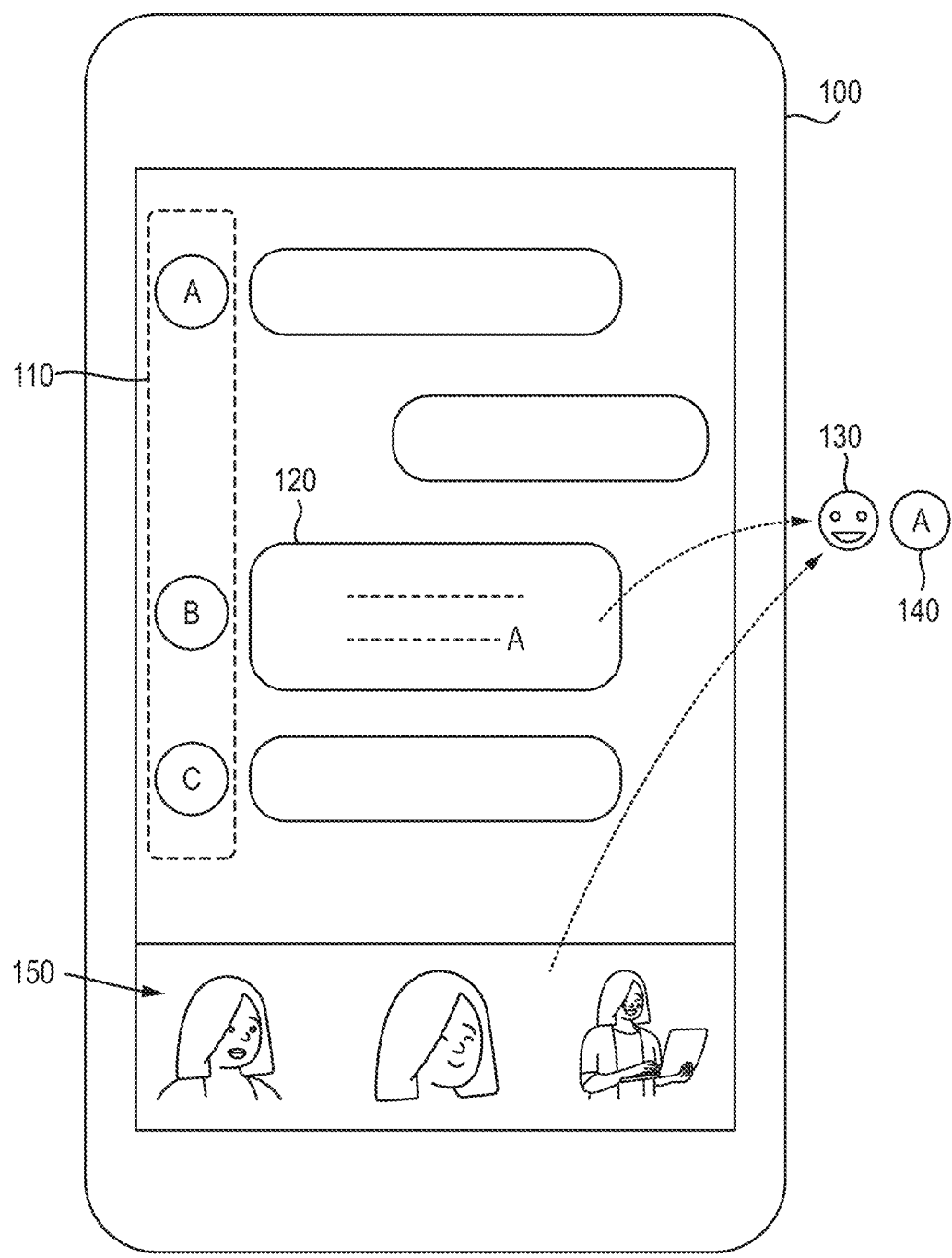
FIG. 1 illustrates an overview of a system for suggesting personal graphical elements within a conversation based on a determined emotion and known relationships among the conversation participants, in accordance with some examples of the disclosure.

FIG. 1 shows an exemplary computing device 100, which in this example is a mobile phone, which is used for suggesting one or more personal graphical elements to a user for potential inclusion in a conversation. The phone is shown displaying a conversation within a messaging application. This conversation involves multiple participants 110: A, B, and C, along with the user of the phone.

A specific message within the conversation 120 is highlighted for analysis. This message is from participant B and mentions participant A. The system's analysis of this message has determined the emotion of the message as 'happy' 130.

Based on the determined emotion 'happy' 130, and the mentioned participant who has been identified as person A 140, the system suggests several personal graphical elements 150, to the user. These suggested personal graphical elements are associated with participant A and reflect the emotion 'happy'. The user can view these suggestions and decide whether to include any of these personal graphical elements in their responses within the conversation.

In some examples, the method involves analyzing at least one message in a conversation to determine an emotion. The analysis may be performed by an emotion detection module which may use natural language processing (NLP) techniques, sentiment analysis or other suitable techniques to determine an emotion being expressed in the message by understanding a conversation context.

In some examples, the context of a conversation may include the current chatting session and the identity of the conversation participants. In some embodiments, a user-defined time period 'N' may dictate the scope of the conversation context, encapsulating all conversations that have occurred within the past N minutes. For instance, N may be set to five minutes. In another example of the disclosure, a time gap 'T' may be defined to separate chatting sessions. For example, after T minutes of no conversation, the chatting session resets, providing a fresh context for message analysis.

In some examples the proposed method may also account for the depth of the conversation, which refers to the number of messages exchanged prior to the most recent one. This approach acknowledges that the relevance of a message, and thus the appropriateness of a suggested personal graphical element, may not solely depend on the time that has elapsed since it was sent. A message sent ten minutes ago, for instance, may still be relevant if it is part of an ongoing exchange.

In some examples, a trained language model may be employed to determine when a new topic begins. The initiation of a new topic may reset the chatting session, ensuring that the conversation context remains relevant. The language model may be a recurrent deep neural network, such as an RNN (recurrent neural network) or LSTM (long short-term memory) model, capable of accumulating past chatting information into a state vector that serves as the conversation context. This state vector may encapsulate essential information from past conversations, such as the topics discussed, the emotions expressed, and the participants involved. This information may be used to inform the analysis of the conversation context and the determination of the emotion associated with each message.

In another example of the disclosure, pre-trained natural language processing (NLP) models like BERT (bidirectional encoder representation form transformers) and GPT (generative pre-trained transformer) may be used to detect the conversation's emotion based on the context. These language models may be fine-tuned specifically for predicting the emotion of the conversation using training data collected from real chat conversations with manually labeled emotions serving as ground truth.

In some examples, traditional NLP techniques may be used to rank and suggest personal graphical elements based on messages in the conversation. For example, tokenization and part-of-speech (POS) tagging may be performed to identify person names, emotional adjectives, or action words, and build a mapping table from these identified words to the personal graphical elements' tags. This mapping table enables the provision of related personal graphical elements based on the conversation context.

In some examples, any suitable method capable of analyzing context in a conversation and determining the associated emotion may be used. While recurrent neural networks and LSTM models and pre-trained natural language processing models are mentioned as examples, other types of machine learning models or natural language processing techniques may also be employed.

In some examples, the appropriateness of suggesting personal graphical elements, may vary based on the nature of the conversation. For instance, in formal or serious conversations, personal graphical elements might not be suitable. A decision-making module may be employed to determine whether to activate the suggestion functionality for the current conversation. This decision may be informed by a machine learning model trained on the conversation data and may be further refined based on user preference settings.

In some examples, the user interface may offer a control for the user to manually activate or deactivate the suggestion function. This control may manifest as a switch or button on the chatting interface, overriding the decision-making module's output based on the switch/button's status. In another example of the disclosure, this feature may be implemented as a user-adjustable setting with three states: always on, always off, and smart decision. The 'smart decision' state would rely on the machine learning model to determine when to activate or deactivate the suggestion function.

In some examples, the method may also include identifying the participants involved in the conversation. This may be accomplished by an identification module which may access data such as user profiles, contact information, social media accounts and associated connections or other relevant data sources to determine the identity of the participants. This information may be used in tailoring the selection of personal graphical elements to the individuals involved in the conversation.

In some examples, the system may simply determine the participants based on the user accounts or identifiers associated with the conversation thread. This may involve analyzing the metadata associated with the conversation, such as the sender and recipient information in a chat thread or email exchange.

Metadata may include a wide range of information linked to the person in question, such as their name, relationship to the user, age, interests, or any other characteristic that may be inferred from the digital media asset or from external data sources. Metadata associated with a personal graphical element may provide detailed information about the graphical element itself. This metadata may include, for instance, the ID of the parent image, indicating where the portion forming the personal graphical element was derived from. It may also include inherited tags from the parent image, such as its original creation date or MIME type. Other details like the creation date of the graphical element, its resolution, and other technical specifications might also be included in the metadata.

This identified metadata may provide context to the personal graphical element. For instance, the metadata may provide information to the emotional state or intention of the person at the time the digital media asset was created. This may be particularly relevant if the emotion or action of the person is ambiguous in the graphical element itself.

Moreover, the metadata may also be used to understand the relationship between the person in the graphical element and the participants in the conversation. This understanding may help in filtering and suggesting the most relevant graphical elements during the conversation.

For example, a graphical element featuring a person who is a close friend of both conversation participants may be given priority over one featuring a less well-known acquaintance.

Furthermore, the identified metadata may be used to enrich the graphical element itself, for instance by adding tags or annotations that provide additional context or clarity. This may be particularly useful when the conversation context is complex or when multiple persons are represented in the graphical elements.

In another example, the system might analyze the content of the conversation itself to identify participants. For instance, if names or other identifying information are mentioned within the conversation, the system may use natural language processing techniques to extract this information and identify the corresponding participants.

For example, consider a messaging application where a conversation is taking place between two users, Alice and Bob. The messaging platform's metadata, such as sender and recipient identifiers, will reflect Alice and Bob as the participants. The system may extract this information directly from the conversation thread's metadata and identify Alice and Bob as the participants. Therefore, the system may then suggest personal graphical elements associated with Alice and Bob based on the context and emotion of their conversation.

Furthermore, the system may also use external data sources to assist in participant identification. For instance, if the conversation is taking place within a social media platform, the system may access the user's profile information, friend lists, or other social graph data to identify the participants. Similarly, if the conversation is happening in an organizational context, the system might use data from an employee directory or other organizational databases to identify participants.

In addition to identifying the direct participants in the conversation, the system may also identify other individuals who are referenced or related to the conversation. This may be particularly useful in scenarios where the conversation is discussing or referring to specific individuals, as it would allow the system to suggest personal graphical elements that are relevant to these individuals.

For instance, if the participants of a conversation are discussing a colleague named "John," the system may utilize natural language processing (NLP) techniques to recognize "John" as an entity within the conversation. The NLP model may be trained to detect mentions of names within the text and associate these mentions with the corresponding individuals. Suppose a conversation goes as follows: Participant A: "Did you hear about John's promotion?"; Participant B: "Yes, I did! John must be thrilled".

In this example, the system may identify "John" as a potential participant, or a person of interest within the context of the conversation, even though he is not directly involved in the conversation. The system may then look up "John" in its database of personal graphical elements, and suggest graphical elements associated with John, such as a graphical element representing John's face expressing excitement, which fits both the context and the emotional tone of the conversation.

In some examples, the method involves selecting from a database of personal graphical elements which are labeled with metadata and an associated emotion. These personal graphical elements may be derived from various digital media assets such as images, videos, or gifs. Each graphical element is associated with a person identified from the digital media asset and tagged with the metadata corresponding to that person and the determined emotion.

In some examples, the selection of personal graphical elements is based on the emotion determined from the conversation and the participants involved in the conversation. For example, if the determined emotion of the conversation is happiness and the participants are identified as Alice and Bob, the system will filter and select the personal graphical elements from the database that are tagged with 'happiness' and are associated with Alice and Bob.

The selected personal graphical elements are then suggested to the user for potential inclusion in the conversation. These personal graphical elements suggested may enhance the expressiveness and personal relevance of the conversation. The user may choose from these suggested personal graphical elements to include in their messages. These suggestions may be presented in any user-friendly manner, such as in a pop-up window, a sidebar, or integrated directly into the conversation interface.

In some examples, the method might further involve a ranking and selection process based on relevance scoring. This scoring could consider factors such as the determined emotion, the identified participants, and the frequency of the personal graphical elements' usage in previous conversations. For example, if a particular graphical element associated with Bob expressing happiness has been frequently used in past conversations, it might be ranked higher and therefore more likely to be suggested for inclusion in the current conversation.

Figure 2:
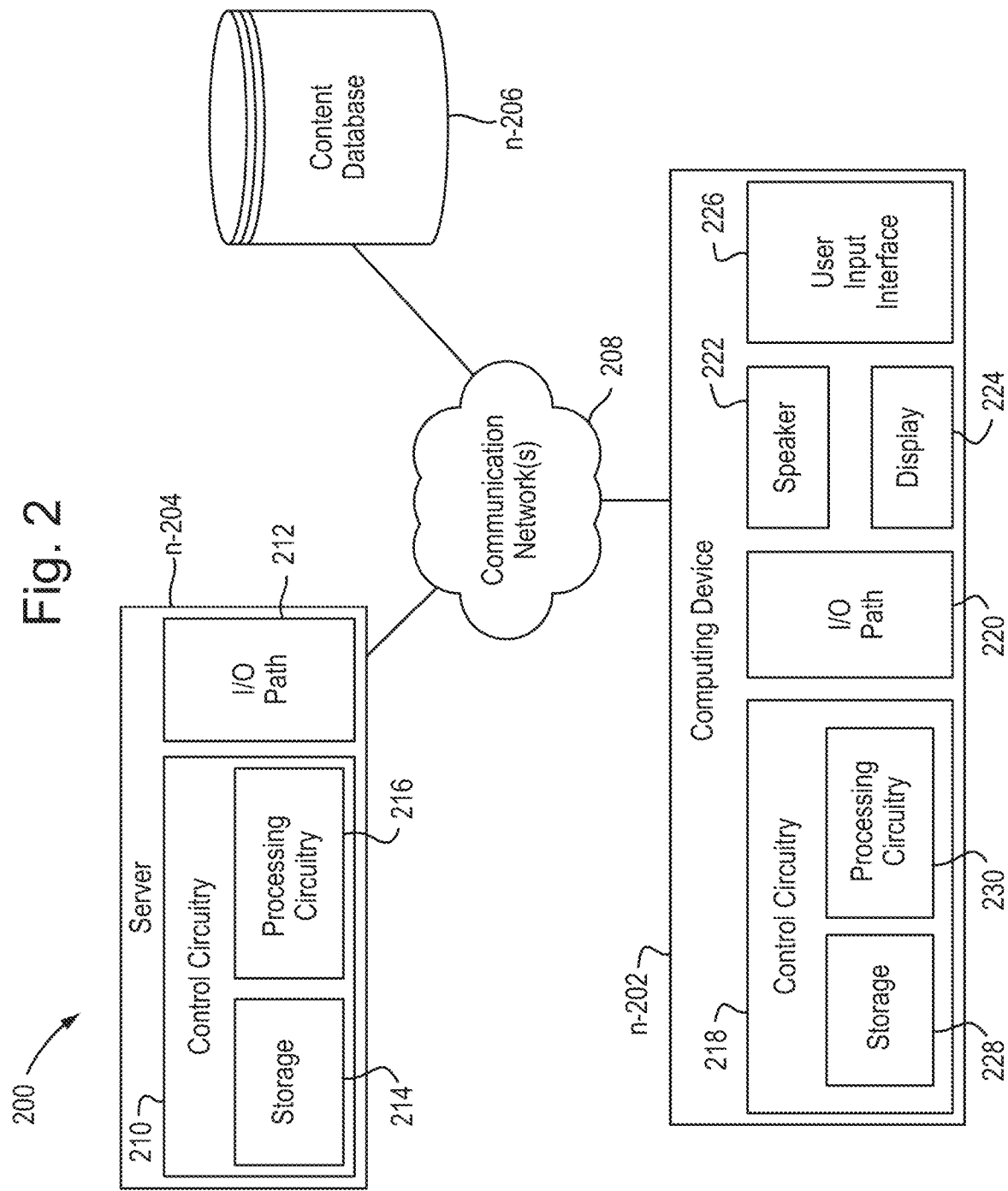
FIG. 2 presents a block diagram showing components of an example system designed for suggesting personal graphical elements within a conversation, and generating personal graphical elements from digital media assets, in accordance with some examples of the disclosure.

FIG. 2 displays an illustrative block diagram, showing system 200, e.g., a non-transitory computer-readable medium, configured to suggest one or more personal graphical elements in a conversation environment. While the figure presents the system as a compilation of various components, it's important to note that the system's design could be more integrated. In certain instances, any number of components within system 200 may be consolidated or integrated as one device.

The system includes computing device n-202, which could represent any number of computing devices such as a smartphone, tablet, laptop, or desktop computer. These devices could be utilized by the user to interact with the conversation environment and the personal graphical elements suggested by the system. The user can view, select, and incorporate these elements into their conversation.

Server n-204, which represents any suitable number of servers may host the software application that underlies the system's functionality, process the data collected by the system, and execute the algorithms that analyze the conversation, identify participants, determine emotions, and suggest personal graphical elements.

Additionally, the system may include one or more content databases n-206. These databases could be repositories that store a wide array of graphical elements, metadata, user information, conversation data, and other relevant content. By accessing these databases, the system may fetch the necessary information to perform its functions.

These components are communicatively coupled to communication network 208, which may be the Internet or any other suitable network or group of networks. This connectivity allows the components to exchange data.

In some examples, the system might not include server n-204, and the functionality usually implemented by server n-204 is instead implemented by other components of the system, such as computing device n-202. The computing device n-202 may implement some or all of the functionality of server n-204, allowing it to communicate directly with content database n-206.

Server n-204 consists of control circuitry 210 and input/output (I/O) path 212. The control circuitry includes storage 214 and processing circuitry 216. The storage may hold the server's operating system, the software application, and other necessary data, while the processing circuitry may execute the software application and process the data.

Similarly, computing device n-202 includes control circuitry 218, I/O path 220, a speaker 222, a display 224, and a user input interface 226. The control circuitry 218, which includes storage 228 and processing circuitry 230, operates in a similar manner to the control circuitry of the server. It executes the client-side of the software application, processes the data, and manages the device's operations.

The storages 214, 228, and any other storages in system 200 are designed to store electronic data, computer software, or firmware. They may be based on various technologies like hard drives, solid-state drives, or technologies like quantum storage devices. These storage devices hold the various types of content, metadata, and other types of data required by the system. They could also contain non-volatile memory for storing the system's boot-up routine and other essential instructions.

Control circuitries 210 and/or 218 execute instructions for the application stored in memory (e.g., storage 214 and/or 228). They may be instructed by the application to perform the functions discussed herein. In some examples, any action performed by control circuitry 210 and/or 218 may be based on instructions received from the application. The application could be implemented as software, or a set of executable instructions stored in storage 214 and/or 228 and executed by control circuitry 210 and/or 218. The application may also have a client/server architecture where only a client application resides on computing device n-202, and a server application resides on server n-204.

The application may be implemented using any suitable architecture. For instance, it could be a stand-alone application wholly implemented on computing device n-202, with instructions for the application stored locally (e.g., in storage 228), and data for use by the application downloaded on a periodic basis. Control circuitry 218 retrieves instructions for the application from storage 228, processes the instructions to perform the functionality described herein, and based on the processed instructions, determines what action to perform when input is received from user input interface 226.

In client/server-based examples, control circuitry 218 may include communication circuitry suitable for communicating with an application server (e.g., server n-204) or other networks or servers. Instructions for carrying out the functionality described herein may be stored on the application server. Communication circuitry may include a cable modem, an Ethernet card, or a wireless modem for communication with other equipment, or any other suitable communication circuitry.

In another example of a client/server-based application, control circuitry 218 runs a web browser that interprets web pages provided by a remote server (e.g., server n-204). For example, the remote server may store the instructions for the application in a storage device. The remote server may process the stored instructions using circuitry (e.g., control circuitry 210) and/or generate displays. Computing device n-202 receives the displays generated by the remote server and may display the content of the displays locally via display 224. This way, the processing of the instructions is performed remotely (e.g., by server n-204) while the resulting displays, such as the display windows described elsewhere herein, are provided locally on computing device n-202.

Computing device n-202 receives inputs from the user via input interface 226 and transmits those inputs to the remote server for processing and generating the corresponding displays. User input interface 226 could be any suitable user interface, such as a touchscreen on a smartphone or a keyboard on a computer. It allows the user to interact with the system, input their responses, make their choices, and control the system's operation.

Server n-204 and computing device n-202 can transmit and receive content and data via I/O path 212 and 220, respectively. These paths could include a communication port(s) configured to transmit and/or receive (for instance to and/or from content database n-206), via communication network 208, content item identifiers, content metadata, natural language queries, and/or other data. Control circuitry 210 and/or 218 may be used to send and receive commands, requests, and other suitable data using I/O paths 212 and/or 220.

Figure 3:
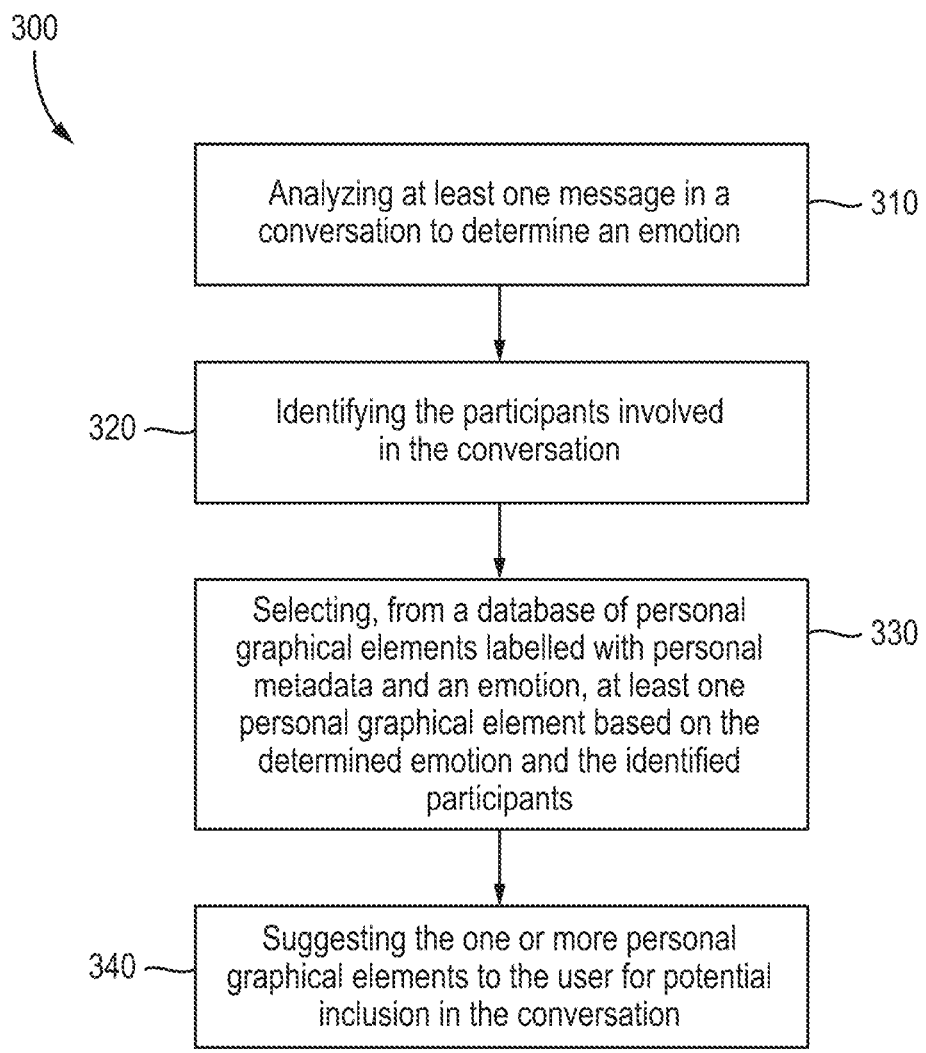
FIG. 3 depicts a flowchart that outlines a process for suggesting personal graphical elements, in accordance with some examples of the disclosure.

FIG. 3 illustrates a flowchart representing a process 300 for suggesting one or more personal graphical elements to a user for potential inclusion in a conversation, in accordance with some examples of the present disclosure.

At step 310 the system analyzes at least one message in a conversation to determine an emotion. In some examples, the system may analyze the content of a message within a conversation. The analysis is not restricted to a single message but can extend to multiple messages within the same conversation.

In some examples the system may analyze the textual content, examine the lexical and syntactic structure, and also investigate the usage of specific words or phrases. This analysis may further extend to non-textual elements within a message such as emojis, punctuation, or formatting, which may provide additional cues about the emotion conveyed in the message.

In some examples, the system may use natural language processing and machine learning algorithms to evaluates the content of the message, determining the emotional sentiment or tone of the message, which could be any emotion such as happiness, sadness, excitement, anger, and more.

In some examples, the system may classify the emotional sentiment using a predefined set of emotions, which may be as basic as positive, neutral, and negative, or may be more granular and include a wider range of emotions.

In some examples, the system might also consider the intensity of the emotion. For example, the emotion 'joy' could be categorized at different intensities like 'happy', 'elated', or 'ecstatic'. The emotion determination may be performed using various techniques such as sentiment analysis, emotion AI, or other suitable techniques.

In some examples, the message may be audio based. Here, audio data is analyzed to extract relevant information that could inform the selection of personal graphical elements. The system may employ speech-to-text technology to transcribe the audio messages into text format. Following the transcription, natural language processing (NLP) techniques may be utilized to derive the emotional context and other pertinent details from the transcribed text, in a manner similar to how text-based messages are processed.

In some examples, the system may also implement audio signal processing techniques to detect characteristics like tone, pitch, volume, and speed of the speaker's voice, which may provide additional clues about the speaker's emotional state or the context of the conversation. Based on the derived information, the system may suggest suitable personal graphical elements to the user.

At step 320 the system identifies the participants involved in the conversation. The system may identify participants by analyzing a variety of information associated with the messages in the conversation. For example, the system may examine usernames, display names, or other unique identifiers linked to the messages. The identifiers may include but are not limited to user IDs, email addresses, phone numbers, or any other form of identifiable information that uniquely distinguishes each participant.

In some examples, the system might also analyze metadata associated with each message in a conversation. This metadata could include information about the sender and receiver of each message, the timestamp of the message, or the device from which the message was sent. Such metadata may provide additional contextual clues that assist in accurately identifying the participants.

In some examples, the system may consider the context of the conversation to aid in participant identification. For example, it might analyze the content of the messages to determine who is being mentioned or addressed within the conversation. This may involve the use of natural language processing techniques to understand references to participants within the messages, such as pronouns or nicknames.

The system might also consider the history of previous interactions between potential participants. In some examples, the system may have access to a database or a log of prior conversations, allowing it to infer relationships between participants based on their past interactions.

In some examples, in addition to the current conversation, the system may take into account other concurrent or recent conversations involving the same participants. For example, if a participant is involved in multiple ongoing conversations, the system may use information from these other conversations to better understand the participant's role and relationships in the current conversation.

At step 330 the system selects, from a database of personal graphical elements labelled with metadata and an emotion, at least one personal graphical element based on the determined emotion and the identified participants.

In some examples, the database may comprise a collection of personal graphical elements, each of which is labeled with metadata and associated with a particular emotion. The metadata may include, but is not limited to, details such as the parent ID, which indicates the source of the specific portion. Additionally, the metadata may inherit tags from the parent image, such as the original creation date, MIME type, and other relevant attributes. The graphical element itself may be assigned its own creation date and resolution, ensuring comprehensive data about its composition. Moreover, the metadata may incorporate a tag that signifies the emotion or gesture depicted in the portion, leveraging techniques like facial expression and body language analysis.

In some examples, the system may employ algorithms to match the personal graphical elements with the determined emotion and the identified participants. These algorithms may consider multiple factors such as the intensity of the determined emotion, the interpersonal relationships between the participants, the context of the conversation, and the metadata of the graphical elements. The algorithms may also be configured to balance various factors, such as the relevance of the graphical element to the emotion and participants, and the diversity of the suggested graphical elements.

In some examples, the system may also apply filtering or ranking methods to the personal graphical elements in the database. For example, the system may exclude graphical elements associated with emotions that are not relevant to the determined emotion. Similarly, the system may prioritize graphical elements associated with participants who have a more significant or central role in the conversation.

In some examples, the system may also account for the temporal aspects of the conversation. For example, the system may give higher preference to graphical elements that are more recent, or it may consider the frequency of use of certain graphical elements over time.

Furthermore, the system may also adapt its selection process based on user feedback or past performance. For example, if certain types of graphical elements are frequently selected or positively received by the participants, the system may adjust its algorithms to favor similar types of graphical elements in future selections. Similarly, less desired or preferred types of graphical elements may be deprecated in future recommendations.

At step 340 the system suggests the one or more personal graphical elements to the user for potential inclusion in the conversation. In some examples, the suggested personal graphical elements may appear in an interface related to the conversation, such as a chat window in a messaging application.

In some examples, the system may present these personal graphical elements in an interface that is directly related to the ongoing conversation. This interface may be a part of a variety of platforms, such as a messaging application, a social media platform, or any other communication medium where the conversation is taking place. The presentation of the personal graphical elements in the context of the conversation may aid the user in making an informed decision about whether to include these elements in their response or not.

In some examples, the personal graphical elements may be displayed in a pop-up window, a sidebar, or directly within the chat window. In other examples, the personal graphical elements may be presented as part of a drop-down menu or a scrollable list.

In some examples, the system may provide additional information about each suggested personal graphical element to help the user make their decision. This information may include the emotion associated with the graphical element, the personal metadata, or a brief description of why this particular graphical element was selected based on the context of the conversation.

In some examples, the system may also allow the user to preview how the personal graphical element will appear in the conversation if they choose to include it. This can be done, for example, by providing a 'preview' function that shows the graphical element in the context of the conversation before the user sends it.

In some examples, the system may also allow the user to customize the suggested personal graphical elements before they are included in the conversation. This customization could include resizing the graphical element, adding additional text or annotations, or modifying the color or style of the graphical element.

In some examples, the customization could be the enhancement or exaggeration of the emotion displayed by the personal graphical element. This allows the user to adjust the intensity or expressiveness of the emotion to better match their intended message or response within the conversation.

In some examples, the system may provide tools or controls that allow the user to adjust the degree of the emotion displayed by the personal graphical element. These controls may include sliders, drop-down menus, or other interactive elements that can be used to modify the intensity or expressiveness of the emotion. For example, if the personal graphical element displays a facial expression associated with happiness, the user may adjust this to display a broad smile or a more subdued, content expression.

Furthermore, the system may also be configured to generate additional versions of the personal graphical element based on the user's adjustments. In these instances, the system may use the original personal graphical element as a template and modify the emotion and other parts of the element to create new versions. These versions could offer a range of emotional intensities or different portrayals of the same emotion, giving the user a wider selection to choose from.

This process may involve image manipulation algorithms, or it may utilize a predefined set of versions for each personal graphical element stored in the database. For example, the system could store several versions of the same personal graphical element, each displaying a different degree of the same emotion, and present these to the user when they choose to enhance or exaggerate the emotion. This process may also engage techniques such as text-to-image generative artificial intelligence. Here, the system may take as input the stored graphical element and a textual description of the desired emotion. The AI model may then generate a modified personal graphical element that aligns with the desired emotion.

Once the personal graphical elements are presented to the user, they may then make a decision on whether to include one or more of these elements in their response in the conversation. The user may choose to include these elements as they are, modify them, or reject them altogether.

Figure 4:
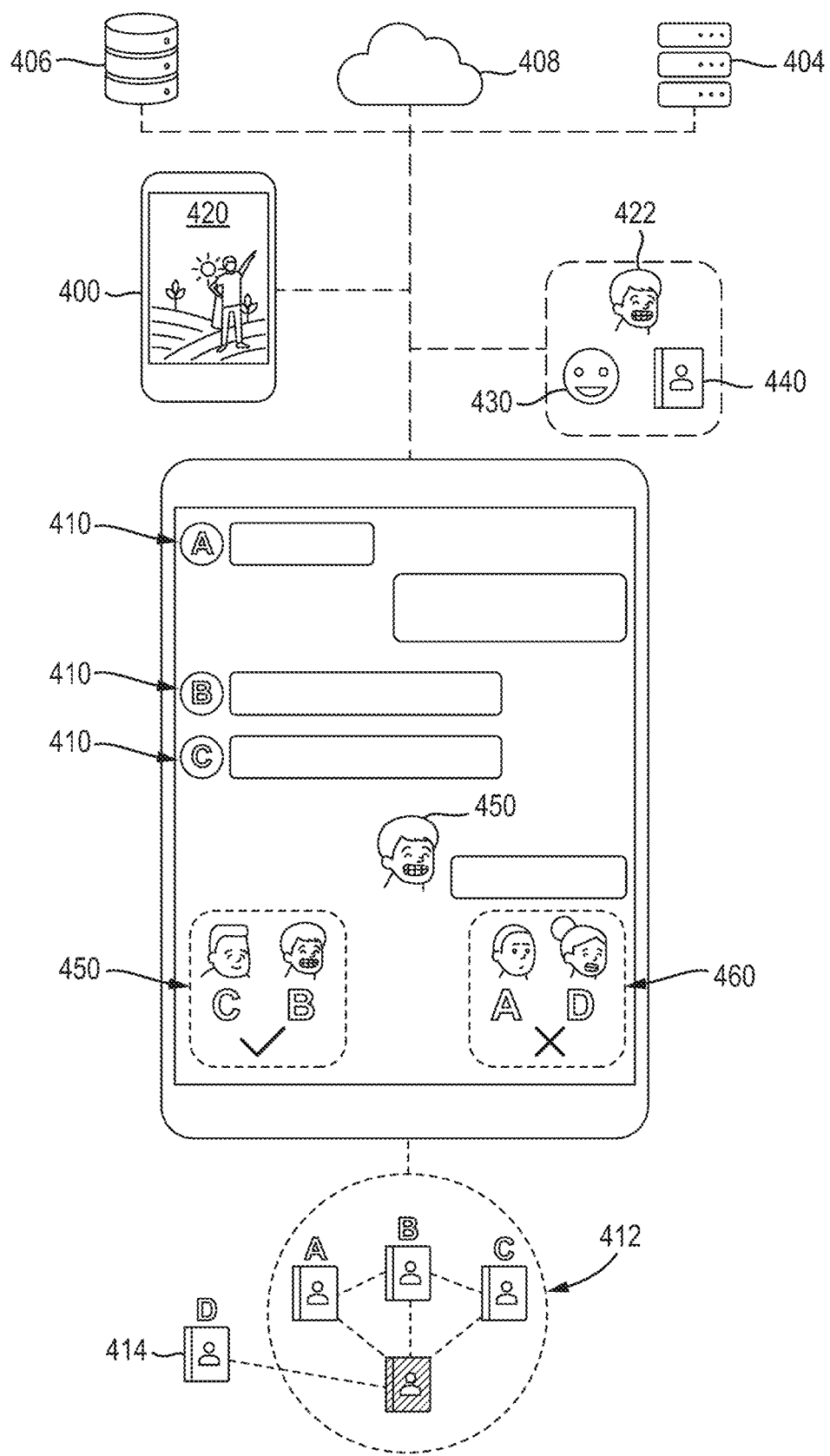
FIG. 4 shows a system for generating, and determining the selection of personal graphical elements based on the context of the conversation, the identified participants, and their respective relationships, in accordance with some examples of the disclosure.

FIG. 4 shows a process for generating a personal graphical element 422 from a media asset 420, which is sourced from a computing device 400. The personal graphical element is then associated with an emotion 430 and metadata 440. In the example provided, the associated emotion is 'happy', but it is understood that in other examples, this emotion may be any other sentiment such as 'sad', 'angry', or 'excited', among others.

In some examples, participants 410 of a conversation are identified. In this example, the participants are labeled as A, B, and C. However, it is to be noted that in other examples, there could be more or fewer participants, and they may be identified by other means such as usernames, user IDs, or other unique identifiers.

The system proceeds to select personal graphical elements from a database 406 which may be connected via a network 408 which may be connected to a server 404. The selection may be based on the determined emotion and the identified participants. In the example shown, personal graphical elements of persons C and B are selected, both representing the 'happy' emotion. It is important to note that these elements pass through a selection process 450, which ensures their relevance to the conversation and the emotional context.

In some examples, the system may use a scoring mechanism to rank personal graphical elements. This considers factors such as emotion alignment, participant relevance, and usage frequency. The highest scoring elements are then suggested to the user, providing more contextually relevant and personalized options for the ongoing conversation.

There may also be personal graphical elements which do not pass the selection process 460. For example, the personal graphical element of person A does not reflect the correct emotion determined from the messages. Additionally, person D's personal graphical element is excluded because person D is not mutually known by all the participants in the conversation. This highlights the system's capability to intelligently filter out irrelevant or inappropriate personal graphical elements. Personal graphical elements which do not pass the selection process 460, may or may not be visible to the user.

A relationship tree 414 is shown to visually represent the connections between the participants. Participants who are mutually known to one another 412 are illustrated inside a circle, indicating their shared relationship. This relationship tree may play a role in determining the appropriate personal graphical elements for a given conversation.

Finally, the user selects the personal graphical element of participant B 424, which accurately depicts the determined emotion. In some examples, this selection may be performed via a user interface on the computing device 400. The selected personal graphical element may then be included in the conversation.

Figure 5A:
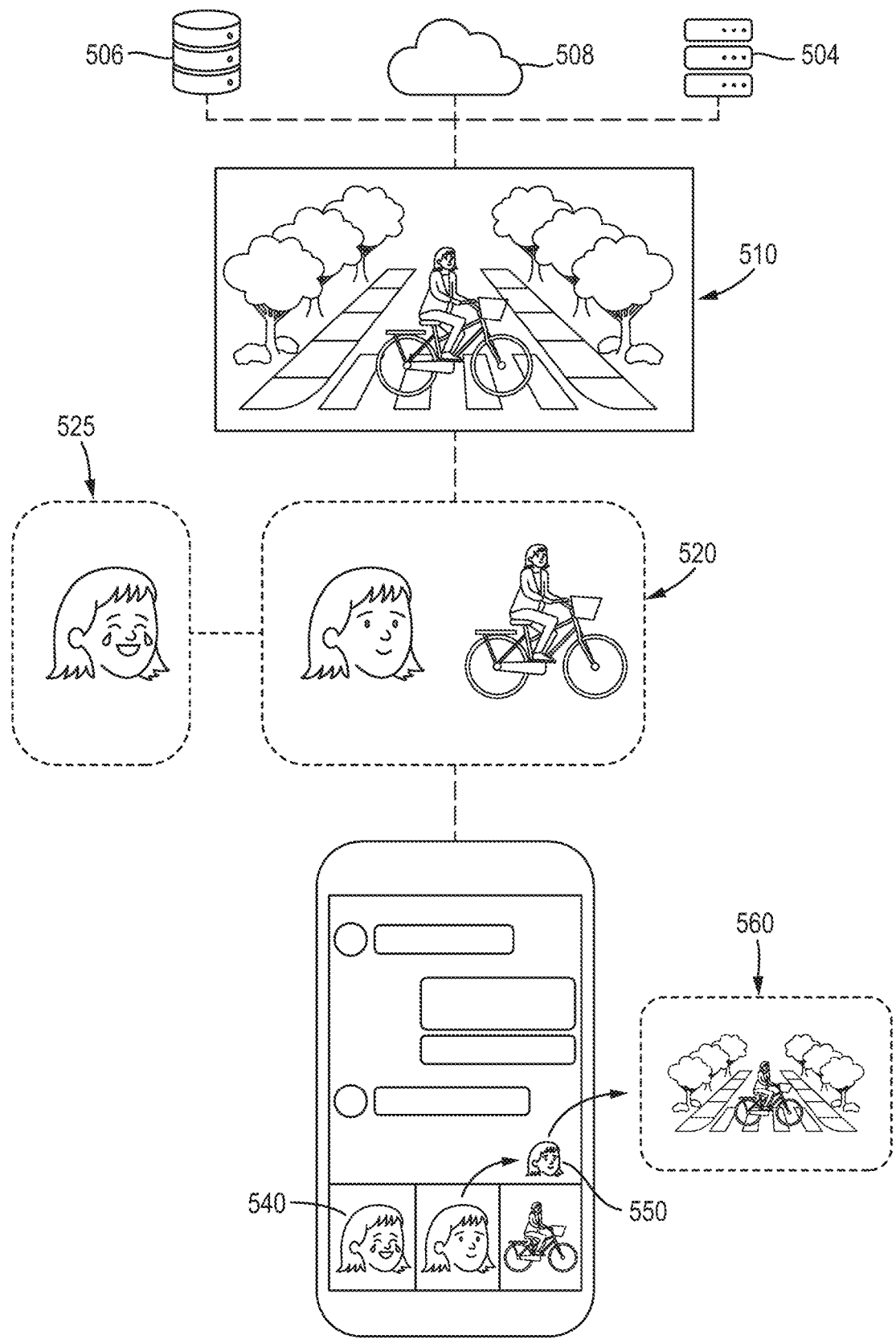
FIG. 5a depicts a system for deriving personal graphical elements from a digital media asset such as an image, and providing an option to view the parent image from which the element was derived, in accordance with some examples of the disclosure.

FIG. 5a presents a system that includes a server 504, a network 508, and a database 506. This system facilitates the creation of personal graphical elements and their subsequent usage in a conversation. However, the creation of personal graphical elements and their subsequent usage in a conversation may also take place locally without requiring connection to a server, network or external database.

Initially, an image 510, which can be derived from a media asset such as a photograph, video frame, or digital illustration, is processed by the system. In some examples, the system may analyze each frame from a media asset, such as a video and identify multiple potential frames which display a person with an identified emotion. These frames may be arranged visually in a curve, whereby each frame arranged along the curve may represent an intensity of emotion. Frames corresponding to local maxima in these curves, exceeding a predetermined emotional threshold may be extracted, segmented, and tagged.

The image, in this example, displays a person riding a bicycle. From this image, multiple personal graphical elements 520 are derived. These elements are not limited to static imagery but may also encompass dynamic content such as gifs, animations, or video clips. These graphical elements may include various views or aspects of the original image. For example, one of the graphical elements might present a full-body view of the person riding the bicycle, while another might be a close-up of the person's head.

In some examples, a sub-process within the system takes one of the personal graphical elements, in this case, the close-up of the person's head, and enhances the emotional expression displayed. This enhancement could involve exaggerating the person's facial expression or making subtle adjustments to more accurately convey a certain emotion. In another example the sub-process may create a new personal graphical element which represent a different emotion using the existing personal graphical element as a template. The exact nature of the enhancement would depend on the emotion associated with the personal graphical element, the context of the conversation, and possibly the preferences of the user.

Once the personal graphical elements, which may be still images, animated stickers, or short video clips, are created and potentially enhanced, they are suggested to the user as represented by 540. These suggestions may occur within the context of a messaging application, where the personal graphical elements are presented alongside the user's input field, or through another interface associated with the conversation. The system may also generate further personal graphical elements using pre-existing digital media assets associated with the person represented in the personal graphical elements. For instance, a text-to-image generative model may be utilized to create a new personal graphical element which comprises a person performing a specific action, from a pre-existing digital media asset or personal graphical element. This approach does not require capturing a person in every possible scenario; instead, it may use a few representative images and a model trained to generate that person's depiction in various settings. The user may then select one of these suggested personal graphical elements to include in their message. This selected personal graphical element, denoted by 550, is included as part of the user's message.

The system may also enable other participants in the conversation to view the personal graphical elements sent as part of the user's message. These participants may be able to interact with the personal graphical element in various ways, such as clicking or tapping on it for more information or to view it in greater detail. In some examples, these participants also have the option to view the parent image 560 from which the personal graphical element was derived. This functionality allows the participants to gain additional context or information about the personal graphical element, which may enhance their understanding or appreciation of the user's message.

In some examples, the system may support the generation of disappearing personal graphical elements. These disappearing personal graphical elements, once sent, are not savable by the recipient and will vanish from the messaging application after a predetermined duration. This disappearing property can be inherited from the properties of the original image. For instance, if the original image is tagged as private, then any personal graphical element generated from this image will likewise inherit this disappearing characteristic. In some examples, the user may manually set this property for each personal graphical element individually or in batch mode, providing flexibility in how they manage and share their personal graphical elements.

Figure 5B:
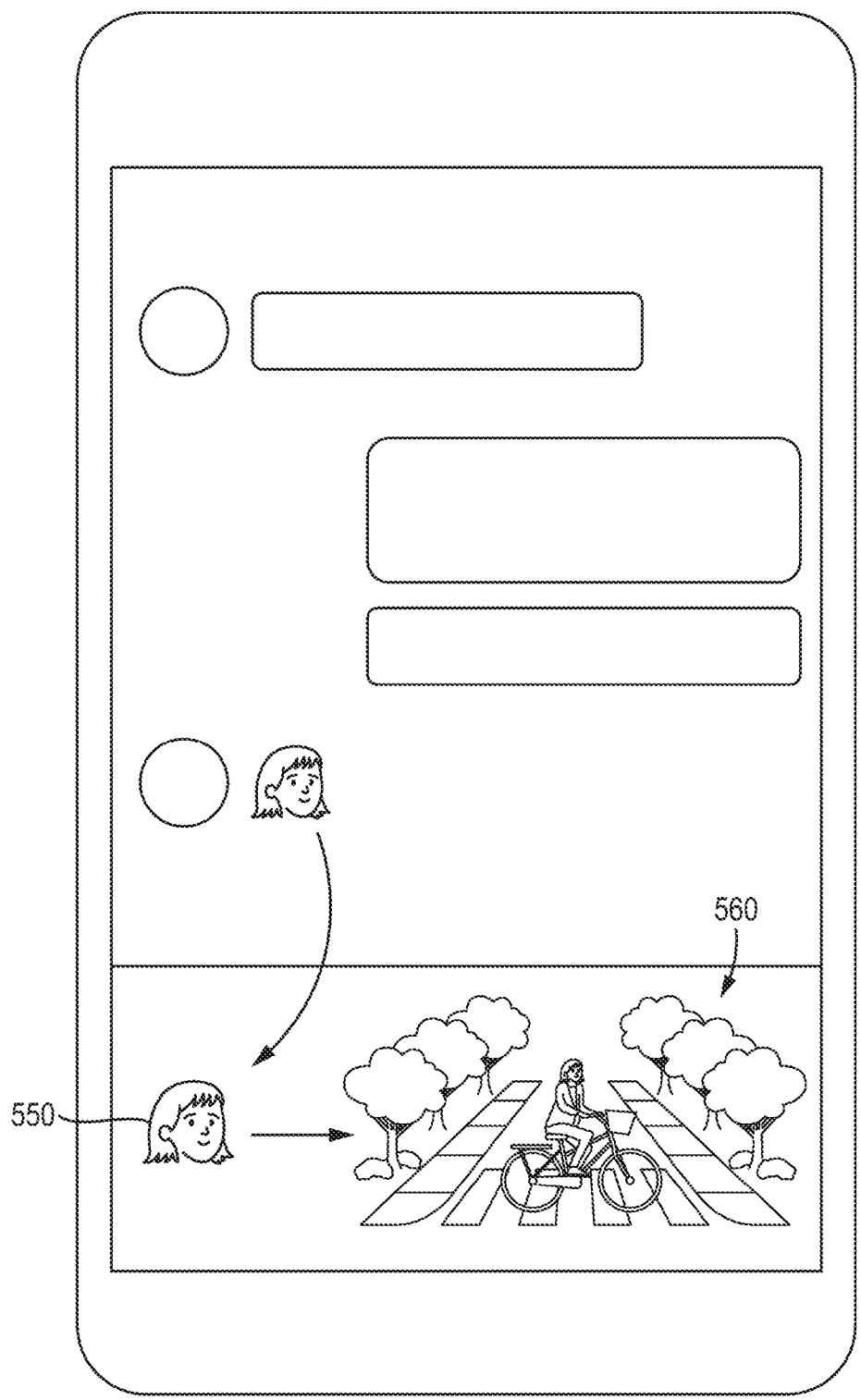
FIG. 5b illustrates a participant's view of the personal graphical element and the ability to access and view the parent digital media asset from which the element was created, in accordance with some examples of the disclosure.

FIG. 5*b* provides an illustration of a process from the perspective of a participant in a conversation who receives a message containing a personal graphical element 550.

Upon receipt of the message, the participant is presented with the personal graphical element 55. This personal graphical element, which was selected and sent by another user as part of their message, is visible within the user interface of the application or platform facilitating the conversation. The personal graphical element can encapsulate various forms of content, such as an image, animation, or other forms of graphical representation, and may communicate or emphasize a particular emotion or sentiment as related to the ongoing conversation.

In some examples, the personal graphical element may be a still image, which captures a specific moment or scenario. This could be a photograph or a digitally created image, selected, or generated to emphasize a particular emotion or sentiment. The image could be of the user themselves, another participant in the conversation, or any other individual or object relevant to the conversation.

In other examples, the personal graphical element may be an animation or a moving image. This could be a short video clip, an animated GIF, or any other form of motion picture. The animation may involve a series of images that depict a sequence of events, a loop of continuous motion, or any other dynamic content that may contribute to the emotional sentiment of the message.

The personal graphical element may also include other forms of graphical representation, such as emoji-like caricatures, cartoon avatars, emotes, stickers or even three-dimensional models. These graphical representations can be designed to mimic the appearance and expressions of the user or other participants, and can be customized or adjusted to reflect a wide range of emotions and sentiments.

In some examples, the system may incorporate machine learning or AI models to generate new personal graphical elements based on existing ones. The AI model may be trained to understand the structure and attributes of the personal graphical elements in the database, such as the depicted individuals, emotions, and associated metadata. The model may then use this understanding to generate new graphical elements that maintain the same fundamental characteristics of the existing elements, such as the identity of the depicted individuals and the associated emotions, but present these in novel ways.

In some examples, the system also allows the participant to interact with the personal graphical element. In some examples, this interaction may involve the participant selecting or clicking on the personal graphical element within the conversation interface. Upon such interaction, the system may be configured to display the full parent image 560 from which the personal graphical element was derived.

In some examples, the personal graphical element may incorporate an interactive feature, such as a hyperlink, which when selected by a user or participant in the conversation, directs the user to the original or parent image from which the personal graphical element was derived.

In some examples, the system may be equipped with a graphical user interface (GUI) that facilitates the participant's interaction with the personal graphical element. This GUI may include various controls, indicators, or prompts that guide the participant's interaction, such as clickable buttons, slider bars, or tooltips.

In some examples, the system may be further capable of tracking these interactions for future reference. This could be employed to optimize the selection and suggestion of personal graphical elements in future conversations, potentially improving the system's accuracy and relevance over time.

In other examples, upon the interaction with the personal graphical element, the system may display additional details or options related to the personal graphical element. For instance, the system may provide an option to save the personal graphical element for later use, share it with other participants, or even modify the personal graphical element, such as changing its size, orientation, or emotional expression.

The parent image 560 may provide additional context and information about the personal graphical element. For example, while the personal graphical element may depict a close-up of a person's face displaying a specific emotion, the parent image may show the full scene or situation that led to that emotion. This may involve a wider scene, other individuals, or other contextual elements that were present in the original media asset but were not included in the personal graphical element.

In some examples, users may opt to automatically share the full photo from which the sticker was created. Additionally, the recipient of the message containing the personal graphical element may request access to the parent image. If the recipient already has access to the parent image, for example, if it was previously shared with them, part of a message history, or accessible via a social media platform, an option such as "Show Full Photo", may be provided enabling them to view the original context of the personal graphical element.

In some example, personal graphical elements may be generated from photos or videos shared by friends, such as in messaging apps or on social media. The sharer may have the option to embed metadata, specifying whether their content can be used for generating personal graphical elements. When multiple persons are present in the shared content, the sharer may specify usage permissions per individual, offering a granular level of control over the generation of personal graphical elements.

Figure 6:
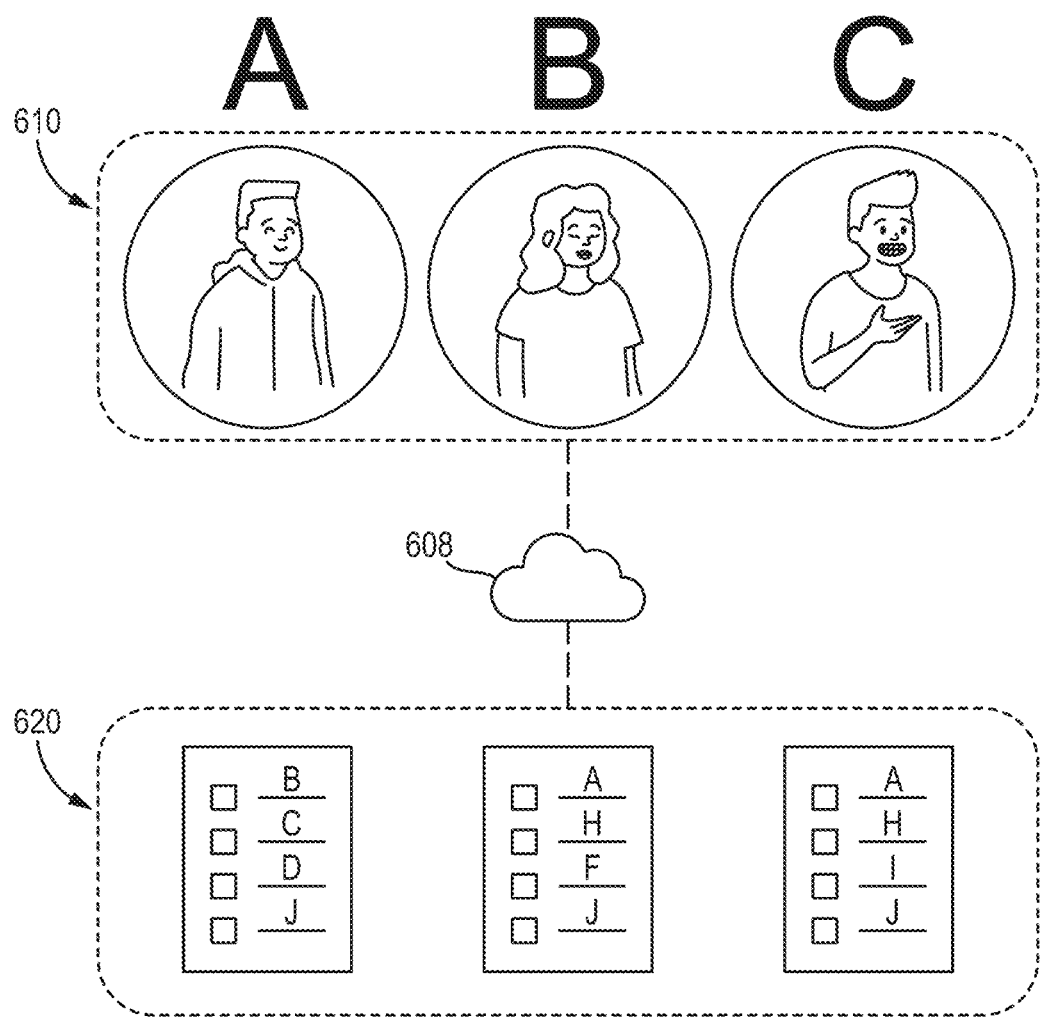
FIG. 6 shows an example of a relationship table associated with conversation participants and the individuals they know, which may inform the selection process of personal graphical elements, in accordance with some examples of the disclosure.

FIG. 6 shows an example of the comparison between relationship tables associated with different participants in a conversation. In this particular example, the participants in the conversation, labeled as A, B, and C, are indicated at 610.

Each participant submits a relationship table 620 to the system upon entering a conversation. These relationship tables represent the connections each participant has with other individuals, acting as a catalog of personal relationships that are known to that particular participant. For example, participant A's relationship table indicates known connections with individuals B, C, D, and J. Similarly, participant B's table lists A, H, F, and J, while participant C's table includes A, H, I, and J.

The system subsequently cross-references these relationship tables to identify shared relationships among the participants. In this example, participants A, B, and C are all involved in the ongoing conversation. Therefore, personal graphical elements associated with any of these three participants may be suggested to each participant, given their mutual presence in the conversation.

Furthermore, the system also identifies individual J as a common connection among all three participants, despite J not being directly involved in the conversation. Consequently, personal graphical elements featuring individual J may also be suggested to the participants, as their mutual connection to J may be relevant or meaningful in the context of their interaction.

To supplement the information listed in the relationship tables and enhance the precision of its operations, the system may leverage external databases to gather additional metadata for each individual mentioned in the relationship tables. Such metadata may include demographic details, social media activity, shared interests, and other data that could influence the selection of personal graphical elements.

In certain examples, the system may be configured to interface with a variety of external databases or information sources, such as social media platforms, online communities, professional networks, or public records, among others.

The nature of the metadata gathered can span a wide range of categories. For example, demographic data can be assembled, which might encompass age, gender, location, or other key indicators that can provide insight into an individual's personal context. This information may be used to tailor the selection of personal graphical elements to an individual's characteristics or preferences.

Furthermore, the system may also gather information regarding an individual's social media activity. This may entail an analysis of their posts, likes, shares, followers, and following lists, among other aspects. By analyzing these aspects, the system may gain an understanding of an individual's interests, sentiments, and social connections, which in turn may guide the selection and suggestion of personal graphical elements.

Shared interests between individuals are another type of metadata that the system may consider. By identifying common hobbies, passions, or activities among individuals, the system may suggest personal graphical elements that resonate with these shared interests, thereby enhancing the relevance and appeal of these elements within the conversation.

Other data that may influence the selection of personal graphical elements may include an individual's communication style, the frequency and nature of their interactions with others, their commonly used expressions, or phrases, or even their preferred types of media content.

The system, shown connected to a network at 608, may facilitate this process by enabling the collection, storage, and analysis of these relationship tables and the associated metadata. This networked connectivity may allow for real-time updates and adjustments to the relationship tables.

Figure 7:
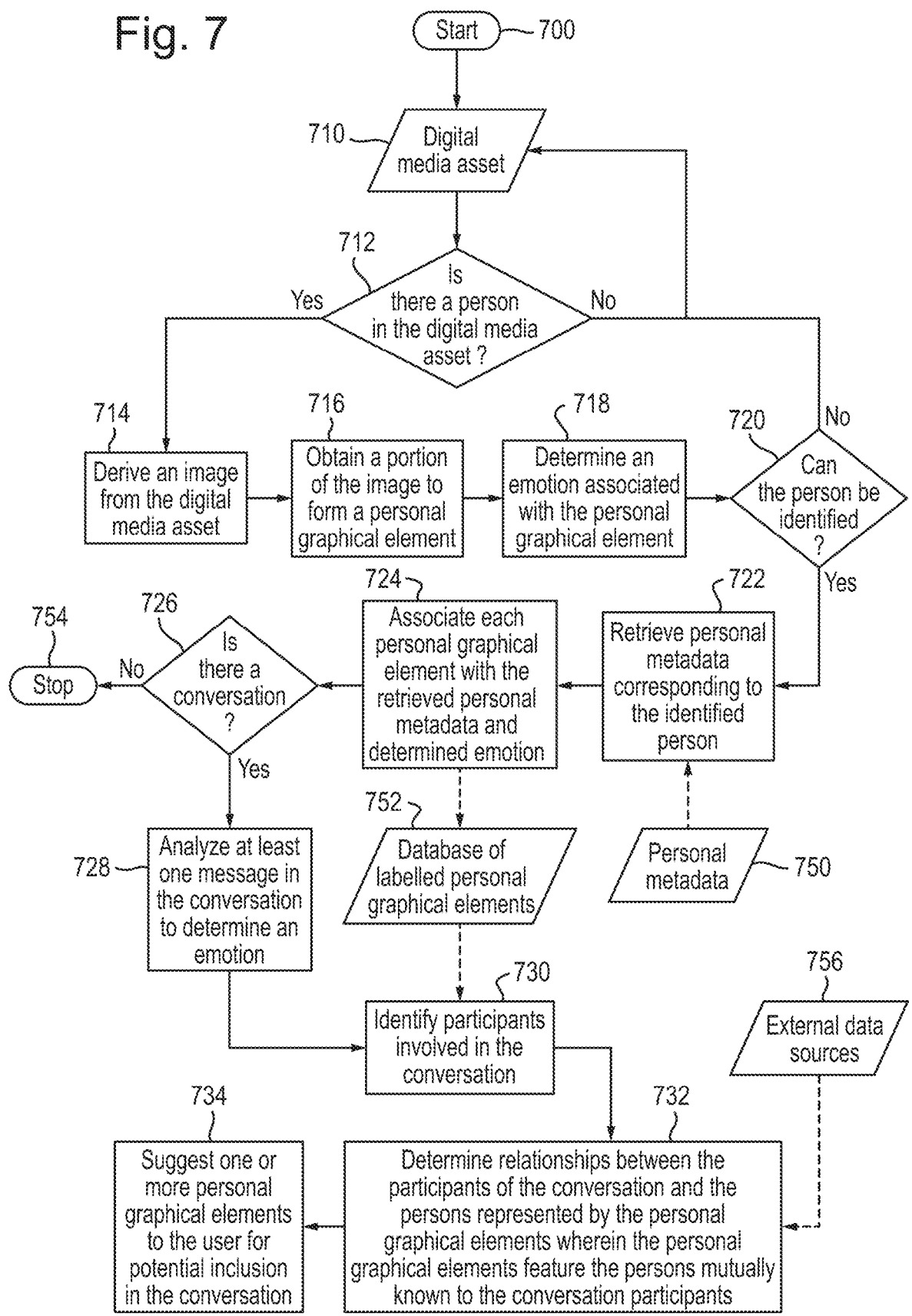
FIG. 7 illustrates a detailed flowchart depicting a comprehensive process for selecting, generating, and suggesting personal graphical elements within a conversation, in accordance with some examples of the disclosure.

FIG. 7 presents a flowchart depicting a detailed sequence of operations in the process of creating and suggesting personal graphical elements based on a media asset and the context of an ongoing conversation, starting at operation 700.

At step 710, a media asset is selected. This selection may be automated, based on a predefined set of criteria, or manually done by the user. The media asset may be any form of digital content, such as a photograph, video, or other media assets, that contains potential subjects for the creation of personal graphical elements.

At step 712, the system determines whether a person is detected in the selected media asset. Various image or video analysis algorithms, such as facial recognition or object detection techniques, may be employed for this purpose. If no person is detected, the system loops back to operation 710, prompting a new selection of a media asset.

In the case where a person is detected, operation 714 is initiated where an image is derived from the media asset. The derived image could be a full frame from the media asset or a cropped segment focusing on the detected person.

Subsequently, at step 716, a portion of the derived image is obtained to form a personal graphical element. This could involve cropping, resizing, or applying other image manipulation techniques to highlight the person detected in the image.

At step 718, an emotion associated with the personal graphical element is determined. This could be done through techniques such as facial expression analysis, body language analysis, or even contextual clues within the image.

Step 720 involves determining if the person featured in the personal graphical element can be identified. The system may use facial recognition algorithms or cross-reference other metadata associated with the media asset for this purpose. If the person cannot be identified, the system loops back to step 710 for a new media asset selection.

If the person is identified, step 722 retrieves metadata corresponding to the identified person. This step is fed by a metadata database at 750, which may contain information such as demographic details, social media activity, shared interests, and other relevant data.

At step 724, each personal graphical element is associated with the retrieved metadata and determined emotion. The result is fed into a database of labelled personal graphical elements at 752, which stores the associations for future reference.

Step 726 detects if there is a conversation. If no conversation is detected, the process stops at 754. If a conversation is ongoing, step 728 is initiated where at least one message in the conversation is analyzed to determine an emotion. This could involve natural language processing techniques to understand the sentiment of the message content.

At step 730, participants of the conversation are identified. This could involve analyzing usernames, display names, or other identifiable information associated with the messages in the conversation.

At step 732, the system determines the relationships between the participants of the conversation and the persons represented by the personal graphical elements. Here, the system ensures that the personal graphical elements feature a person mutually known to the conversation participants.

Subsequent to step 732, the process advances to step 734 where the system suggests one or more personal graphical elements to the user for potential inclusion in the conversation.

The sequence of the steps illustrated in the process may be re-arranged, and certain steps may be performed in a different order, concurrently or even omitted, depending on the specific implementation of the system. The order in which these operations are described is not intended to be construed as a limitation, and any number of the described operations can be combined in any order to implement the process.

For example, the system may first identify the person detected in the media asset before forming a personal graphical element. Upon detection of a person in the media asset at operation 712, the system could proceed to operation 720 where the system determines if the person can be identified. If the person can be identified, the system retrieves metadata corresponding to the identified person from the metadata database at operation 722.

Subsequently, the system may return to operation 714 to derive an image from the media asset, and then proceed to operation 716 to obtain a portion of this image to form a personal graphical element. The personal graphical element is then associated with the previously retrieved metadata and a determined emotion at operation 724.

This alternate order of operations might be advantageous in scenarios where the identity of the person in the media asset influences the formation of the personal graphical element, for example, the portion of the image chosen to form the personal graphical element might depend on the retrieved metadata of the identified person.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
    analyzing at least one message in a conversation to determine an emotion;
    identifying participants involved in the conversation;
    selecting, from a database of personal graphical elements associated with metadata comprising a person identifier and an emotion, a plurality of personal graphical elements based on the determined emotion and the identified participants involved in the conversation;
    determining relationships between each of the identified participants involved in the conversation and each person identifier for each of the plurality of personal graphical elements;
    ranking in order the one or more personal graphical elements based on whether each of the plurality of the personal graphical elements feature persons mutually known to the participants of the conversation; and
    providing in ranked order the one or more personal graphical elements to a user for potential inclusion in the conversation.

2. The method of claim 1, further comprising generating the database of personal graphical elements comprising:
    identifying at least one person from a digital media asset;
    obtaining a portion of an image to form a personal graphical element, wherein the image is from the digital media asset;
    retrieving metadata corresponding to the identified person;
    determining an emotion associated with the personal graphical element; and
    associating each of the obtained personal graphical element with the retrieved metadata and the determined emotion.

3. The method of claim 2, further comprising a user interface element configured to provide the participants involved in the conversation with an option to request viewing of a parent digital media asset associated with the personal graphical element included in the conversation.

4. The method of claim 2, wherein the digital media asset comprises one or more of a video, or a GIF.

5. The method of claim 2, further comprising determining an action being performed by the identified person.

6. The method of claim 1, wherein determining relationships between the participants of the conversation and the persons represented by the personal graphical elements is further informed by data from external sources including, but not limited to, social media accounts.

7. The method of claim 1, further comprising modifying the personal graphical element by enhancing the determined emotion.

8. The method of claim 1, wherein analyzing at least one message in a conversation to determine an emotion is selectively applied to a specific portion of the conversation.

9. The method of claim 1, wherein the personal graphical elements are ranked and selected based on relevance scoring that considers the determined emotion, the identified participants, and a frequency of the personal graphical elements' usage in previous conversations.

10. A system comprising:
memory;
control circuitry configured to:
- analyze at least one message in a conversation stored in memory to determine an emotion;
- identify participants involved in the conversation;
- select, from a database of personal graphical elements associated with metadata comprising a person identifier and an emotion, a plurality of personal graphical elements based on the determined emotion and the identified participants involved in the conversation;
- determine relationships between each of the identified participants involved in the conversation and each person identifier for each of the plurality of personal graphical elements;
- rank in order the one or more personal graphical elements based on whether each of the plurality of the personal graphical elements feature persons mutually known to the participants of the conversation; and
- provide in ranked order the one or more personal graphical elements to a user for potential inclusion in the conversation.

11. The system of claim 10, wherein the control circuitry is further configured to:
- identify at least one person from a digital media asset;
- obtain a portion of an image to form a personal graphical element, wherein the image is from the digital media asset;
- retrieve metadata corresponding to the identified person;
- determine an emotion associated with the personal graphical element; and
- associate each of the obtained personal graphical element with the retrieved metadata and the determined emotion.

12. The system of claim 11, further comprising a user interface element configured to provide the participants involved in the conversation with an option to request viewing of a parent digital media asset associated with the personal graphical element included in the conversation.

13. The system of claim 11, wherein the digital media asset comprises one or more of a video, or a gif.

14. The system of claim 11, wherein the control circuitry is further configured to: determine an action being performed by the identified person.

15. The system of claim 10, wherein determining relationships between the participants of the conversation and the persons represented by the personal graphical elements is further informed by data from external sources including, but not limited to, social media accounts.

16. The system of claim 10, further comprising control circuitry configured to enhance the determined emotion of the personal graphical element.

17. The system of claim 10, wherein analyzing at least one message in a conversation to determine an emotion is selectively applied to a specific portion of the conversation.

18. The system of claim 10, wherein the control circuitry is configured to:
- rank and select the personal graphical elements based on a relevance scoring that considers the determined emotion, the identified participants, and a frequency of the personal graphical elements' usage in previous conversations.

* * * * *